United States Patent [19]
Shikamori et al.

[11] 3,907,082
[45] Sept. 23, 1975

[54] CLUTCH AND BRAKE FOR A WASHING MACHINE

[75] Inventors: Tamotu Shikamori; Eiichi Hasegawa, both of Hitachi, Japan

[73] Assignee: Hitachi, Ltd., Japan

[22] Filed: Jan. 15, 1974

[21] Appl. No.: 433,436

[30] Foreign Application Priority Data
Jan. 16, 1973 Japan.................................. 48-6629

[52] U.S. Cl............................. 192/12 BA; 192/36
[51] Int. Cl.²....................................... F16D 67/02
[58] Field of Search ...................... 192/12 BA, 17 D

[56] References Cited
UNITED STATES PATENTS
2,751,773  6/1956  Woodson...................... 192/12 BA
2,758,685  8/1956  Sisson......................... 192/12 BA X
3,451,512  6/1969  Sacchini et al................. 192/12 BA Primary Examiner—Benjamin W. Wyche
Attorney, Agent, or Firm—Craig & Antonelli

[57] ABSTRACT

A drive device for a washing machine and dehydrating machine wherein a pulsator and a dehydration tank are selectively driven by a single motor to perform a washing operation and a dehydrating operation, such drive device using coil spring clutch means for switching a power supply from the motor between the pulsator and the dehydration tank. The coil spring clutch means can be assembled as a unit and detachably mounted on the pulsator shaft, so that maintenance and inspection thereof can be facilitated.

3 Claims, 3 Drawing Figures

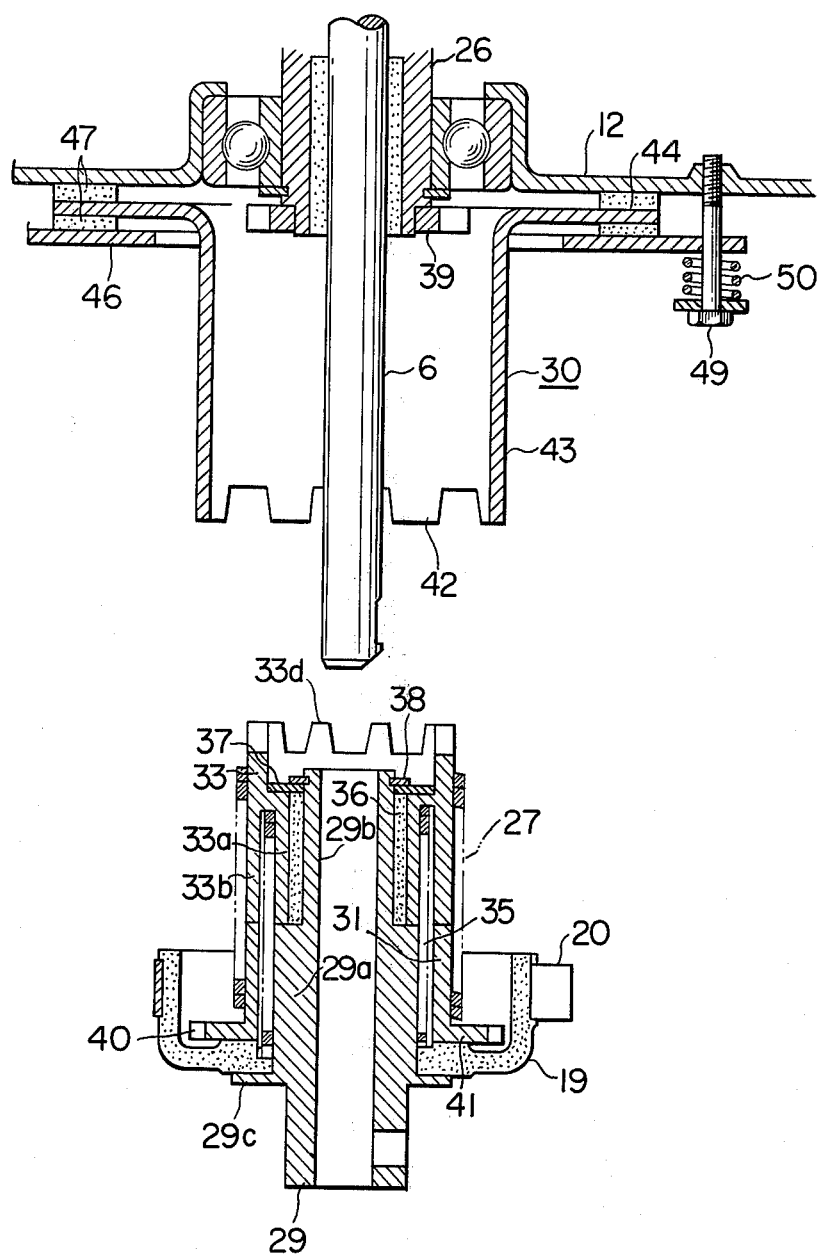

CLUTCH AND BRAKE FOR A WASHING MACHINE

BACKGROUND OF THE INVENTION

This invention relates to a drive device for a washing and dehydrating machine.

In one type of washing and dehydrating machines known in the art, a pulsator is arranged in the center bottom portion of a dehydration tank serving concurrently as a washing tank, and only the pulsator is driven when washing is performed and both the pulsator and the dehydration tank are driven when dehydration is performed. Such known washing and dehydrating machines use a coil spring clutch for switching a power supply from a motor or other drive source between the pulsator and the dehydration tank. The coil spring clutch offers the advantage of producing a high transmission torque in spite of the fact that it can be operated with a relatively small force. However, it has a disadvantage in that it should be provided with two coil springs when used for driving the pulsator, one for driving the same in the normal direction and the other in the reverse direction.

Coil spring clutches available for use with washing and dehydrating machines with each clutch having three coil springs as described in U.S. Pat. No. 3,306,082 granted Feb. 28, 1967.

In the conventional drive device of the aforementioned type, three coil springs are arranged in three stages along the axis of the pulsator shaft. Because of this arrangement, all the components of the clutch should be successively inserted from below the pulsator shaft in assembling the clutch. Combined with the fact that the clutch has a number of component parts, this has hitherto lowered the efficiency with which the coil is assembled. In addition, there is another disadvantage in conventional coil springs. A coil spring must be mounted on the boss such that the former exerts a clamping force of a predetermined value on the latter. However, since it is necessary to bring the coil spring to a state in which it is unwound with a certain force when it is mounted on the boss, the degree of efficiency with which the coil spring clutch operates is further lowered.

The greatest disadvantage of the conventional coil spring clutch has been that, when one of the coil springs does not operate properly, it is not possible readily to remove it once the coil spring clutch is assembled.

SUMMARY OF THE INVENTION

This invention obviates the aforementioned disadvantages of the prior art. Accordingly, one object of the invention is to reduce as much as possible the number of component parts of the coil spring clutch so as to reduce cost of production and increase reliability in performance.

Another object of the invention is to provide a coil spring clutch which can be assembled with a high degree of efficiency and which facilitates maintenance and inspection.

Another object of the invention is to provide a coil spring clutch which makes it possible to effect switching with a force of low magnitude and with a high degree of reliability in performance.

The coil spring clutch according to the invention is characterized in that it uses two clutch springs mounted on a clutch shaft and that such coil springs are constructed and operate as follows: One of the coil spring is adapted to be selectively brought into pressing engagement with a clutch boss disposed inwardly of the clutch spring and with the inner periphery of another clutch boss spaced apart from the outer periphery of the clutch spring by a small distance, depending on the direction of rotation, so that a drive force can be transmitted to perform a dehydrating operation, prevent revolution of the dehydration tank when a washing operation is performed and apply the brake to the dehydration tank when revolution of the dehydration tank is to be stopped. The other coil spring performs the function of preventing revolution of the dehydrating tank in the opposite direction when a washing operation is performed. The clutch bosses which can be assembled as a unit with the clutch shaft are connected to a dehydration tank shaft and a brake flange by means of a claw coupling, so that the drive device according to the invention can be readily withdrawn as a unit axially of the clutch shaft.

BRIEF DESCRIPTION OF THE DRAWINGS

FIG. 3 is a vertical sectional view of the drive device according to the invention, showing the clutch means detached as a unit from the machine.

DESCRIPTION OF A PREFERRED EMBODIMENT

This invention can be incorporated in a washing and dehydrating machine provided with a dehydration tank and a pulsator disposed on the bottom portion of the dehydration tank. Specifically, the invention has particular utility in what is referred to as a fully-automatic washing machine which performs a series of washing operations according to instructions given by a timer.

Figure 1:
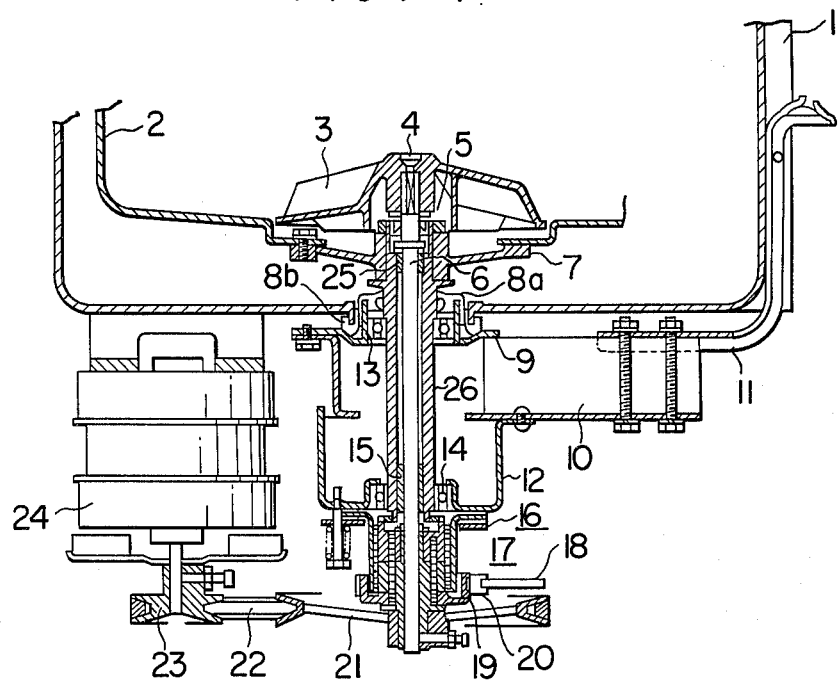
FIG. 1 is a vertical sectional view of the drive device for a washing and dehydrating machine comprising one embodiment of the invention.

The invention will be described with reference to a preferred embodiment thereof shown in the drawings. FIG. 1 is a vertical sectional view of essential portions of a washing and dehydrating machine in which 1 is an outer tank for containing water therein, and 2 a dehydration tank arranged in the outer tank 1 concentrically therewith and formed in its walls with a multitude of openings for discharging water therethrough. Disposed in the central portion of the bottom of the dehydration tank 2 is a pulsator 3 which is affixed, by a cap screw 4, to the upper end of a pulsator shaft 6.

The dehydration tank 2 is affixed, through a flange 7, to a hollow dehydration tank shaft 26 disposed outwardly of the pulsator shaft 6 concentrically thereof. Bearing metal members 15 and 25 are interposed between the pulsator shaft 6 and the dehydration tank shaft 26, and a shaft seal 5 is mounted on the upper ends of the two shafts 6 and 26. The dehydration tank shaft 26 and the separator shaft 6 extend downwardly of the bottom of the outer tank 1, with the dehydration tank shaft 26 being supported by a ball bearing 13 held by an upper case 9 and a ball bearing 14 held by a lower case 12.

The upper case 9 and the lower case 12 are secured to an intermediate case 10 interposed therebetween and connected to an intermediate case suspending member 11 as a unit. The aforementioned parts are mounted on the underside of the bottom or an one side of the outer tank 1 by known means. A shaft seal 8a is interposed between the outer tank 1 and the dehydration tank shaft 26 while another shaft seal 8b is interposed between the upper case 9 and the dehydration tank shaft 26 so as to maintain the outer tank and the upper case in airtight seal with respect to the dehydration tank shaft 26. Interposed between the underside of the lower case 12 and a pulsator pulley 21 mounted at the lower end of the pulsator shaft 6 are brake means 16, clutch means 17, a clutch operating collar 19, a clutch operating band 20 and a clutch operating lever 18.

The pulsator pulley 21 is connected, through a V-belt 22, to a motor pulley 23 and adapted to be rotated by a reversible motor 24 mounted on the underside of the outer tank 1.

Figure 2:
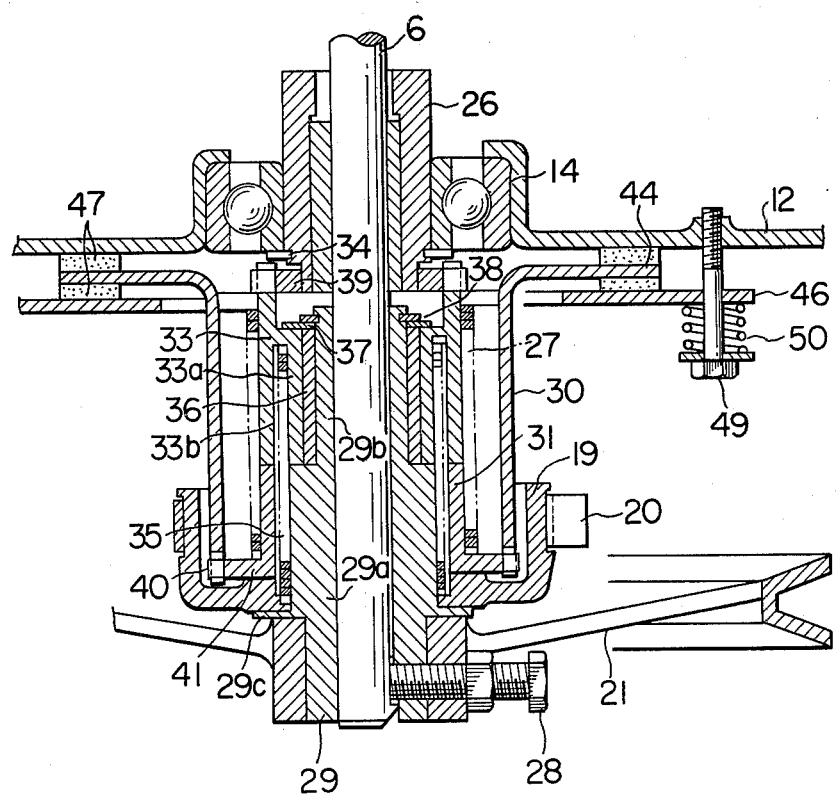
FIG. 2 is a sectional view, shown on an enlarged scale, of the clutch means of the drive device shown in FIG. 1.

FIG. 2 shows the clutch means in detail in section. The pulsator pulley 21 is affixed, together with a clutch shaft 29 fitted over the outer periphery of the pulsator shaft 6, to the pulsator shaft 6 by a cap screw 28.

The clutch shaft 29 has formed integrally therewith a clutch boss 29a on which a clutch spring 35 is wound, a hollow shaft portion 29b smaller in diameter than the clutch boss 29a and extending upwardly from the clutch boss 28a along the pulsator shaft 6, and a flange 29c adapted to support the lower end of the clutch operating collar 19. A clutch boss 33, which is formed in the shape of a double cylinder, is loosely fitted over the hollow shaft portion 29b with a bearing metal member 26 being interposed therebetween. The clutch boss 33 includes an inner boss 33a which, being substantially of the same outer diameter as the clutch boss 29a, is axially aligned with and engages the clutch boss 29a end to end. The coil spring 35 which has a lower end portion engaging the clutch operating collar 19 is wound on the clutch boss 29a and the inner boss 33a by its own resilience.

The clutch boss 33 also includes an outer boss 33b whose inner diameter is slightly larger than the outer diameter of the coil spring 35, so that normally there is a small clearance between the inner periphery of the outer boss 33b and the outer periphery of the coil spring 35. A brake boss 31, which is substantially equal in outer and inner diameters to the outer boss 33b, is axially aligned with and engages the outer boss 33b end to end. The brake boss 31 is fitted over the clutch boss 29b, with the coil spring 35 being interposed between the brake boss 31 and the clutch boss 29a. Another coil spring 27 is fitted over the outer peripheries of the outer boss 33b and the brake boss 31.

As shown in FIG. 3, the clutch boss 33 is formed integrally at its upper end with coupling teeth 33d adapted to be brought into coupling engagement with a claw coupling 39 affixed to the lower end of the dehydration tank shaft 26.

The clutch boss 33 is held in place on the hollow shaft portion 29b of the clutch shaft 29 by a stop ring 38, with a thrust washer 37 being interposed between the stop ring 38 and the clutch boss 33 to prevent dislodging of the latter from the hollow shaft portion 29b.

A flange 41 formed on its outer periphery with coupling teeth 40 is formed integrally at the lower end of the brake boss 31. The coupling teeth 40 are maintained in locking engagement with coupling teeth 42 (FIG. 3) formed at the lower end of a brake flange 30 which includes a cylindrical portion 43 enclosing the outer periphery of the coil spring 27, and a flange portion 44 interposed between the underside of the lower case 12 and a presser plate 46, with brake linings 47 being interposed between the lower case 12 and the flange portion 44 and between the presser plate 46 and flange portion 44. A brake force is imparted to the brake flange 30 at all times by a presser spring 50 mounted between a bolt 40 connecting the presser plate 46 to the lower case 12 and the presser plate 46.

The clutch operating band 20 wound on the outer periphery of the clutch operating collar 19 is formed, for example, by bending a band of spring steel in annular form and tightly forced by its own resilience over the collar 19. One end of the band 20 is turned outwardly to form a projection for the clutch operating lever 18 to be brought into engagement therewith.

The collar 19 and the band 20 are constructed such that, when a high rotational force is exerted on the collar 19 while the lever 18 is in engagement with the projection formed in the band 20, slip occurs between the collar 19 and the band 20.

Before describing the operation of the drive device constructed as aforementioned, certain terminology will be explained which will be used in the following description for convenience in reference only and will not be limiting. The words "rightwardly (clockwise)" and "leftwardly (counter clockwise)" will designate directions in the drawings to which reference is made. The words "rightwardly (clockwise)" and "leftwardly (counter clockwise)" will refer to the directions in which the pulsator pulley 21 rotates in FIG. 2 as seen from below the pulsator shaft 6.

A washing operation performed by the machine according to the invention will first be described. When a washing operation is performed, the operating lever 18 is maintained in locking engagement with the band 20 to hold the lower end of the coil spring 35 stationary through the collar 19.

At this time, if the pulsator pulley 21 rotates rightwardly, a force tending to unwind or loosen the coil spring 35 will be exerted thereon, so that slip occurs between the coil spring 35 and the clutch boss 29a of clutch shaft 29 and the pulsator shaft 6 alone rotates rightwardly. Rotation of the pulsator 3 results in the washing water and clothes to be washed in the dehydration tank 2 revolving in the same direction, with even the tank 2 tending to revolve rightwardly. Since the dehydration tank shaft 26 is connected at its lower end to the clutch boss 33 of the double cylinder type through the claw coupling 39, the clutch boss 33 also tends to revolve rightwardly. However, rightward revolution of tank 2 and clutch boss 33 is precluded, because the coil spring 27 wound on the outer peripheries of the outer boss 33b of clutch boss 33 and the brake boss 31 is tightened and consequently the boss 33 is operatively connected to the brake flange 30. Thus, the pulsator 3 alone rotates and the dehydration tank 2 remains stationary.

When the direction of rotation of the motor 24 is reversed or when the pulsator shaft 6 rotates leftwardly, a force tending to wind or tighten the coil spring 35 on the clutch boss 29a is exerted on the coil spring 35. However, since the lower end of the coil spring 35 is maintained stationary by the collar 19, a force tending to unwind or loosen the coil spring 35 is exerted thereon, so that the outer diameter of the coil spring 35 increased. This results in a slip occurring between the coil spring 35 and the clutch boss 29a, so that the pulsator shaft 6 alone is driven to rotate leftwardly.

The dehydration tank 2 tends to revolve leftwardly as the pulsator 3 rotates leftwardly. However, since the force tending to rotate the dehydration tank 2 acts in a direction such that the coil spring 35 is further unwound or loosened the clutch boss of the double cylinder type 33 connected to the dehydration tank shaft 26, the coil spring 35 is brought into pressing engagement with the inner peripheries of the outer boss 33b and brake boss 31. Thus, the two bosses are operatively connected, with a result that the braking force is exerted on the dehydration tank 2.

When the pulsator shaft 6 rotates leftwardly, the coil spring 27 disposed outwardly of the coil spring 35 is subjected to a force tending to unwind the same. Thus, the pulsator 3 alone rotates when the pulsator shaft 6 rotates leftwardly, with the dehydration tank 2 being kept stationary.

When a dehydrating operation is performed, the motor 24 rotates in one direction only and the collar 19 rotates with the coil spring 35, with the operating lever 18 being withdrawn by a magnet or other known means. The machine is set such that the pulley 21 rotates leftwardly when a dehydrating operation is performed, so that the coil spring 35 wound on the outer peripheries of the clutch boss 29a and inner boss 33b is tightened operatively to interconnect the two bosses. At this time, the coil spring 27 wound on the outer peripheries of the outer boss 33b and brake boss 31 is subjected to a force tending to unwind or loosen the same. Thus, slip occurs between the outer boss 33b and coil spring 27.

This results in the drive force from the motor 24 being transmitted to both the pulsator shaft 6 and the dehydration tank shaft 26, so that the pulsator 3 and the dehydration tank 2 revolve together leftwardly.

At this time, the rotational force imparted to the pulsator pulley 21 is transmitted, through the coil spring 35 and the clutch boss of the double cylinder type 33, to the dehydration tank shaft 26, so that the coil spring 35 is further tightened on the bosses by the transmission torque. Thus, there is almost no possibility of slip occurring not only while the machine is in steady-state operation but also when the machine is started.

This eliminates the fear of the pulsator and the dehydration tank moving relative to each other when a dehydrating operation is started. It is possible to obtain a satisfactory acceleration characteristic when operation of the dehydration tank is started if the motor can produce a sufficiently high output torque. Thus, the invention makes it possible to tide over a difficulty presented by the dangerous speed for the vibration system in a short time interval and reduce noise in a washing machine in which the outer tank 1 and the like are resiliently supported by the outer frame.

The braking action to be preformed by the brake means when the dehydrating operation is completed or interrupted during the operation will be described. If the dehydrating operation is completed or if it is desired to interrupt the dehydrating operation before the operation is finished, the motor is disconnected from the power source and the operating lever 18 is brought to a solid-line position shown in FIG. 1 in which it is brought into locking engagement with the projection formed in the band 20. This results in the lower end of the coil spring 35 being operatively connected to the operating lever 18 through the collar 19, so that a force extending to unwind or loosen the coil spring 35 is exerted thereon. At this time, the dehydration tank 2 revolves at high speed due to inertia, so that the force of high magnitude tending to unwind or loosen the coil spring 35 is transmitted thereto through the clutch boss 33 and the outer diameter of the spring 35 is greatly increased instantaneously. This brings the coil spring 35 into pressing engagement with the inner peripheries of the outer boss 33b and brake boss 31 and interconnects them operatively. This connects the dehydration tank shaft 26 to the brake flange 30 through the clutch boss 33, coil spring 35 and brake boss 31, so that the brake is applied to the dehydration tank shaft 26.

The coil spring 35 is adapted to keep rotating in the same direction even after its outer periphery is brought into pressing engagement with the inner peripheries of the outer boss 33b and brake hose 31. Thus, if the collar 19 were kept completely stationary, stresses would be concentrated in the lower end portion of the spring 35 maintained in engagement with the collar 19 and the spring 35 would finally be damaged. In order to avoid this accident, means is provided to cause the collar 19 and band 20 to move relative to each other when a force of high magnitude is exerted thereon. According to the invention, the clearance between the outer periphery of the coil spring 35 and the inner peripheries of the outer boss 33b and brake boss 31 is very small when the machine is in steady-state operation. This permits the coil spring 35 to be instantaneously unwound or loosened when the brake is applied and the lower end of the coil spring 35 is engaged, thereby instantly applying the brake to the dehydration tank shaft 26.

The braking force exerted by the brake flange 30 can be adjusted as desired by loosening or tightening the bolt 49 to thereby vary the resilience of the spring 50. When it is desired to increase the brake force, one has only to tighten the bolt 49.

The brake linings 47 may undergo wear if the washing machine is in service for a long period of time, reducing the magnitude of the brake force exerted by the brake flange 30. If this is the case, the brake force of the brake flange 30 can be restored to its original level merely by adjusting the bolt 49. This greatly facilitates maintenance and inspection. If wear is caused on the brake linings 47, the brake flange 30 will move upwardly a distance corresponding to the amount of wear. However, since the brake flange 30 is maintained in locking engagement at its lower end with the brake boss 31 through the agency of coupling teeth, performance of the machine does not show a change even if there is a relative displacement of the brake means axially of the pulsator shaft.

Assembling of the drive device according to the invention will now be described. The clutch means shown in FIG. 2 can be disassembled as follows: The cap screw 28 is first loosened, and then the pulsator pulley 21 is moved downwardly and released from engagement with the clutch shaft 29. Thereafter, the clutch boss of the double cylinder type 33, coil springs 27 and 35, brake boss 31, collar 19 and band 20 mounted on the clutch shaft 29 are moved downwardly and released from engagement with the clutch shaft 29 as a unit as shown in FIG. 3. Since the clutch boss 33 and dehydrator tank shaft 26 and the brake boss 31 and brake flange 30 are connected to each other by simple coupling engagement, they can be readily released from engagement with each other by merely moving them axially away from one another.

When it is desired further to disassemble the unit of clutch means shown in FIG. 3 into various component parts, the stop ring 38 is removed by a tool. This permits the clutch boss 33 to be moved upwardly and released from engagement with the clutch shaft 29. The coil spring 27 and brake boss 31 can successively moved upwardly and released from engagement with the clutch shaft 29, thereby finishing the complete disassembling of the clutch means.

In assembling the various clutch components, various component parts are mounted one after another on the flange 29c of the clutch shaft 29 and finally the stop ring 28 is mounted on the washer 37 to prevent dislodging of the parts from the clutch shaft 29. The clutch means assembled as a unit as aforementioned can be moved anywhere as desired. It will be appreciated that the arrangement in which the clutch means can be assembled as a unit beforehand facilitates the operation of mounting the clutch means in each washing machine in producing washing machines on a mass production basis.

An added advantage offered by the drive device using clutch means which can be assembled as a unit beforehand is that it is impossible to test the performance of the clutch means before being mounted on a washing machine. To this end, testing facilities simulating the actual condition in which the clutch means operates when mounted on a washing machine are provided, and the clutch means to be tested is mounted on such testing facilities. By gripping the lower end of the clutch means by a chuck, the clutch means can be rotated both in the normal and reverse directions to test its performance. It is thus possible to ascertain how the clutch means operates before it is actually mounted on a washing machine.

Added advantages offered by the drive device according to the invention include the following: The inner coil spring 27 is only required to produce a very low transmission torque because it is intended to prevent rightward revolution of the dehydration tank when a washing operation is performed. Thus, not only the coil spring 27 but also the bosses on which the coil spring 27 is wound can tolerate ordinary machine finishes. It is only the inner coil spring 35 which requires precise machine finishes and high strength. The clutch boss 33 and brake boss 31 can be worked on with ease if they are made of a sintered alloy.

The embodiment shown in FIG. 2 is constructed such that the inner and outer coil springs 35 and 27 are arranged concentrically, and the brake means is mounted outside the coil springs. This arrangement is effective to reduce the axial dimension of the drive device as compared with drive devices of the prior art. When the drive device according to the invention is mounted on a washing machine, the washing machine has a smaller axial dimension than conventional washing machines, so that it is possible to increase the capacities of the outer tank and the dehydration tank when the dimensions of the outer frame are constant.

The arrangement in which the brake means is disposed at the outside of the clutch means permits a braking force of high magnitude to produced by forcing the brake flange against the brake linings with a force of relatively low magnitude. At the same time, the heat of friction produced when the brake is applied can be quickly dissipated to atmosphere.

The coil spring clutch is characterized in that it can be switched between two sets of clutch bosses for engagement with a relatively small force, in spite of the fact that is produces a very high transmission torque. This enables a magnet of a very small capacity to be employed with a fully-automatic washing machine.

In switching the supply of a drive force from the motor between the different shafts by the clutch means according to the invention, the clutch operating lever strikes the band. However, since slip occurs between the band and the collar as aforementioned when a force higher in magnitude that a predetermined level is exerted on the collar, no great impact is applied to the band and no great noise is produced.

We claim:

1. A drive device for a washing and dehydrating machine of the type comprising a dehydration tank supported by a dehydration tank shaft, a pulsator supported by a pulsator shaft and disposed on the bottom of the dehydration tank, and a drive source for operating both the dehydration tank and the pulsator, said device comprising:
   a. a clutch shaft adapted to be connected to said pulsator shaft and including a clutch boss;
   b. a clutch boss of the double cylinder type adapted to be connected to said dehydration tank shaft and including an inner boss axially aligned with and engaging said clutch boss of said clutch shaft end to end, and an outer boss;
   c. an inner coil spring adapted to be wound on said clutch boss of said clutch shaft and said inner boss of said clutch boss of the double cylinder type;
   d. a brake boss disposed outwardly of said clutch boss of said clutch shaft and axially aligned with and engaging said outer boss of said clutch boss of the double cylinder type, said brake boss engaging a brake flange having one end on which a braking force is exerted at all times, said brake boss being formed at its lower end with a flange provided with coupling teeth, and said brake flange being provided with coupling teeth adapted to be brought into coupling engagement with said coupling teeth of said brake boss;
   e. an outer coil spring wound on the outer peripheries of said brake boss and said outer boss of said clutch boss of the double cylinder type, said brake flange being formed at its outside with a cylindrical portion for enclosing said outer coil spring; and
   f. means adapted to lock and render stationary with a predetermined static torque the end portion of said inner coil spring wound on said clutch boss of said clutch shaft, said locking means producing a transmission torque when the end portion of the inner coil spring is locked and rendered stationary thereby, whereby said inner coil spring can be brought into pressing engagement with the inner peripheries of said outer boss of said clutch boss of the double cylinder type and said brake boss.

2. A drive device according to claim 1, wherein a collar adapted to engage one end portion of said inner coil spring is loosely fitted over one end of said clutch shaft, whereby the drive device can be assembled by successively mounting said inner coil spring, said brake boss, said outer coil spring, and said clutch boss of the double cylinder type on said clutch shaft, and means for preventing dislodging of the clutch boss of the double cylinder type from the clutch shaft mounted between the upper end of the clutch boss of the double cylinder type and the upper end of the clutch shaft.

3. A drive device according to claim 1, wherein said dehydration tank shaft is adapted to be connected to said clutch boss of the double cylinder type by means of a claw coupling, and said clutch boss of the double cylinder type is supported by a hollow shaft portion formed integrally with said clutch boss of said clutch shaft.

* * * * *